United States Patent
Ren et al.

(10) Patent No.: US 12,355,696 B2
(45) Date of Patent: Jul. 8, 2025

(54) METHOD FOR TRANSMITTING AND RECEIVING DEMODULATION REFERENCE SIGNAL OF SIDELINK, AND TERMINAL

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 385 days.

(21) Appl. No.: 17/791,204

(22) PCT Filed: Dec. 16, 2020

(86) PCT No.: PCT/CN2020/136823
§ 371 (c)(1),
(2) Date: Jul. 6, 2022

(87) PCT Pub. No.: WO2021/147572
PCT Pub. Date: Jul. 29, 2021

(65) Prior Publication Data
US 2023/0344588 A1 Oct. 26, 2023

(30) Foreign Application Priority Data
Jan. 23, 2020 (CN) .......................... 202010076539.0

(51) Int. Cl.
*H04L 5/00* (2006.01)
*H04J 13/00* (2011.01)

(52) U.S. Cl.
CPC ........ *H04L 5/0051* (2013.01); *H04J 13/0029* (2013.01)

(58) Field of Classification Search
CPC .......................... H04L 5/0051; H04J 13/0029
See application file for complete search history.

(56) References Cited

U.S. PATENT DOCUMENTS

| | | | |
|---|---|---|---|
| 2018/0241605 | A1 | 8/2018 | Luo |
| 2018/0324732 | A1* | 11/2018 | Park .......................... H04L 5/00 |

(Continued)

FOREIGN PATENT DOCUMENTS

| | | |
|---|---|---|
| CN | 108886448 A | 11/2018 |
| CN | 109309551 A | 2/2019 |

(Continued)

OTHER PUBLICATIONS

International Search Report for PCT Application PCT/CN2020/136823 issued on Mar. 17, 2021, and its English Translation provided by WIPO.

(Continued)

*Primary Examiner* — Derrick V Rose
(74) *Attorney, Agent, or Firm* — Ladas & Parry, LLP

(57) ABSTRACT

This disclosure provides a method for transmitting a demodulation reference signal of a sidelink, a method for receiving the demodulation reference signal of the sidelink, and a terminal. The method for transmitting the demodulation reference signal of the sidelink, applied to a transmitting side terminal, includes: initializing a first demodulation reference signal (DMRS) sequence based on at least one of a slot number, a sidelink synchronization signal identifier or a sidelink synchronization signal block index to generate the first DMRS sequence; transmitting the first DMRS sequence.

14 Claims, 3 Drawing Sheets

(56) References Cited

U.S. PATENT DOCUMENTS

| | | | |
|---|---|---|---|
| 2019/0141650 A1 | | 5/2019 | Lim et al. |
| 2019/0320457 A1 | | 10/2019 | Maaref et al. |
| 2019/0364522 A1 | | 11/2019 | Akkarakaran et al. |
| 2019/0379569 A1 | | 12/2019 | Chae et al. |
| 2021/0105118 A1 | * | 4/2021 | Wu .................... H04W 72/20 |
| 2021/0144659 A1 | * | 5/2021 | Wu .................. H04L 27/26025 |
| 2021/0185706 A1 | | 6/2021 | Park et al. |
| 2022/0272731 A1 | * | 8/2022 | Cha .................... H04W 76/28 |

FOREIGN PATENT DOCUMENTS

| | | | | |
|---|---|---|---|---|
| CN | 110326245 A | | 10/2019 | |
| CN | 111294127 B | * | 3/2022 | ........... H04B 17/382 |
| EP | 3293901 A1 | | 3/2018 | |
| EP | 3353972 A1 | | 8/2018 | |
| KR | 20130132222 A | | 12/2013 | |
| WO | 2017052307 A1 | | 3/2017 | |
| WO | 2020145268 A1 | | 7/2020 | |
| WO | 2021147572 A1 | | 7/2021 | |

OTHER PUBLICATIONS

Written Opinion for PCT Application PCT/CN2020/136823 issued on Mar. 17, 2021, and its English Translation provided by WIPO.
Internationally Preliminary Report on Patentability for PCT/CN2020/136823 issued on Jul. 26, 2022, and English translation provided by WIPO.
"Feature lead summary on AI 7.2.4.3 Sidelink synchronization mechanism," 3GPP TSG RAN WG1 Meeting #99 R1-1912157, Reno, USA, Nov. 18-22, 2019, Source: CATT, Agenda Item: 7.2.4.3, all pages.
"Discussion on NR sidelink synchronization mechanism," 3GPP TSG RAN WG1 #99 Meeting, R1-1912590, Reno, US, Nov. 18-22, 2019, Agenda item: 7.2.4.3, Source: LG Electronics, all pages.
"Feature lead summary on AI 7.2.4.3 Sidelink synchronization mechanism," 3GPP TSG RAN WG1 Meeting #99 R1-1913392, Reno, USA, Nov. 18-22, 2019, Source: CATT, Agenda Item: 7.2.4.3, all pages.
"Feature lead summary on AI 7.2.4.3 #2 Sidelink synchronization mechanism," 3GPP TSG RAN WG1 Meeting #100 R1-2000833, e-Meeting, Feb. 24-Mar. 6, 2020, Source: CATT, Agenda Item: 7.2.4.3, all pages.
First Office Action and search report for Chinese Patent Application 202010076539.0 issued by the Chinese Patent Office on Dec. 22, 2021, and its English translation provided by Global dossier.
Second Office Action for Chinese Patent Application 202010076539.0 issued by the Chinese Patent Office on Jun. 8, 2022, and its English Translation provided by Global dossier.
"Discussion on NR sidelink synchronization mechanism" 3GPP TSG RAN WG1 #98 Meeting, R1-1909518, Prague, Aug. 26-30, 2019, Agenda Item: 7.2.4.3, Source: LG Electronics, all pages.
"PHY Layer structure for NR Sidelink" 3GPP TSG-RAN WG1 Meeting #99, R1-1912597, Reno, NV, US, Nov. 18-22, 2019, Agenda Item: 7.2.4.1, Source: Ericsson, all pages.
Extended European Search Report for the corresponding European Patent Application No. 20915406.1 issued by the European Patent Office on Jun. 7, 2023.
"Feature lead summary on AI 7.2.4.3 Sidelink synchronization mechanism," 3GPP TSG RAN WG1 Meeting #99 R1-191xxxx, (R1-1913465), Reno, USA, Nov. 18-22, 2019, Source: CATT, Agenda Item: 7.2.4.3, all pages.
"S-SSB design and synchronization protocol for NR SL," 3GPP TSG-RAN WG1 Meeting #99, R1-1912601, Reno, NV, USA 18-22, 2019, Source: Ericsson, Agenda Item: 7.2.4.3, all pages.
Third Taiwanese Office Action and search report for the corresponding Taiwanese Patent Application No. 109145627 issued on Jun. 30, 2023 by the Taiwanese Patent Office and its English translation provided by foreign associate.

* cited by examiner

METHOD FOR TRANSMITTING AND RECEIVING DEMODULATION REFERENCE SIGNAL OF SIDELINK, AND TERMINAL

CROSS-REFERENCE TO RELATED APPLICATIONS

The present application is a U.S. national phase application of PCT Application No. PCT/CN2020/136823 filed on Dec. 16, 2020, which claims a priority to the Chinese patent application No. 202010076539.0 filed in China on Jan. 23, 2020, the disclosures of which are incorporated herein by reference in their entireties.

TECHNICAL FIELD

The present disclosure relates to the field of communication technology, in particular to a method for transmitting a demodulation reference signal of a sidelink, a method for receiving the demodulation reference signal of the sidelink, and a terminal.

BACKGROUND

FIG. 1 is a schematic diagram of a long term evolution (LTE) vehicle-to-everything (V2X) sidelink synchronization signal. Terminal 1 transmits the LTE physical sidelink broadcast channel (PSBCH), and terminal 2 receives the PSBCH transmitted by the terminal 1 and demodulates the PSBCH by using an LTE PSBCH demodulation reference signal (Zad-off Chu sequence), so as to obtain system broadcast information to complete synchronization.

In the related new radio (NR) V2X communication, to establish synchronization between two terminals, a terminal first needs to send a synchronization signal block on a sidelink, and a receiving terminal needs to complete the demodulation of the PSBCH based on the demodulation reference signal to obtain the broadcast information.

In the related technology of LTE V2X, the demodulation reference signal is a Zad-off Chu sequence, and the performance of overcoming carrier frequency offset is poor.

SUMMARY

Embodiments of the present disclosure provide a method for transmitting a demodulation reference signal of a sidelink, a method for receiving the demodulation reference signal of the sidelink, and a terminal. Thus, a receiving side terminal can use the demodulation reference signal (DMRS) sequence to complete the demodulation of the PSBCH, and finally complete the sidelink synchronization.

To solve the foregoing technical problems, embodiments of the present disclosure provide the following technical solutions.

A method for transmitting a demodulation reference signal of a sidelink, including:
  initializing a first demodulation reference signal (DMRS) sequence based on at least one of a slot number, a sidelink synchronization signal identifier or a sidelink synchronization signal block index to generate the first DMRS sequence;
  transmitting the first DMRS sequence.

Optionally, the slot number is a new radio air interface (NR Uu) link slot number or a sidelink slot number. Optionally, the initializing the DMRS sequence refers to initialization of a scrambling generator of DMRS sequence.

Optionally, the initializing the DMRS sequence is based on a maximum quantity of S-SSBs transmitted or a subcarrier spacing (SCS).

Optionally, initializing the first demodulation reference signal (DMRS) sequence based on the slot number and the sidelink synchronization signal identifier to generate the first DMRS sequence includes:
  initializing the first demodulation reference signal (DMRS) sequence by using a formula: $c_{init}=2^{11}(\bar{i}_{Slot}+1)(N_{ID}^{SLSS}+1)+2^6(\bar{i}_{Slot}+1)+N_{ID}^{SLSS}$, or $c_{init}=2^{11}(\bar{i}_{Slot}+1)(N_{ID}^{SLSS}+1)+2^6(\bar{i}_{Slot}+1)$ to generate the first DMRS sequence; wherein,
  $c_{init}$ is a parameter in a initialization process of the first DMRS sequence;
  $N_{ID}^{SLSS}$ refers to the sidelink synchronization signal identifier;
  $\bar{i}_{Slot}$ refers to: $\bar{i}_{Slot}=(X_{Slot})$ mod 8,
  or,
  $\bar{i}_{Slot}=3$ LSBs of $(X_{Slot})$, i.e., 3 least significant bits of $X_{Slot}$,
  or,
  for FR1, $\bar{i}_{Slot}=2$ LSBs of $(X_{Slot})$, i.e., 2 least significant bits of $X_{Slot}$;
  for FR2, $\bar{i}_{Slot}=3$ LSBs of $(X_{Slot})$, i.e., 3 least significant bits of $X_{Slot}$;
  wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal identifier and the sidelink synchronization signal block index to generate the first DMRS sequence includes:
  initializing the first demodulation reference signal (DMRS) sequence by using a formula: $c_{init}=2^{11}(\bar{i}_{S\text{-}SSB}+1)(N_{ID}^{SLSS}+1)+2^6(\bar{i}_{S\text{-}SSB}+1)+N_{ID}^{SLSS}$, or, $c_{init}=2^{11}(\bar{i}_{S\text{-}SSB}+1)(N_{ID}^{SLSS}+1)+2^6(\bar{i}_{S\text{-}SSB}+1)$ to generate the first DMRS sequence; wherein,
  $c_{init}$ is a parameter in an initialization process of the first DMRS sequence;
  $N_{ID}^{SLSS}$ refers to the sidelink synchronization signal identifier;
  $\bar{i}_{S\text{-}SSB}$ refers to: $\bar{i}_{S\text{-}SSB}(X_{S\text{-}SSB})$ mod 8,
  or,
  $\bar{i}_{S\text{-}SSB}=3$ LSBs of $(X_{S\text{-}SSB})$, i.e., 3 least significant bits of $X_{S\text{-}SSB}$,
  or,
  for FR1, $\bar{i}_{S\text{-}SSB}=2$ LSBs of $(X_{S\text{-}SSB})$, i.e., 2 least significant bits of $X_{S\text{-}SSB}$;
  for FR2, $\bar{i}_{S\text{-}SSB}=3$ LSBs of $(X_{S\text{-}SSB})$, i.e., 3 least significant bits of $X_{S\text{-}SSB}$;
  wherein, $X_{S\text{-}SSB}$ refers to the sidelink synchronization signal block index.

Optionally, initializing the first demodulation reference signal (DMRS) sequence based on the slot number to generate the first DMRS sequence includes:
  initializing the first demodulation reference signal (DMRS) sequence by using a formula: $c_{init}=2^{11}(\bar{i}_{Slot}+1)+2^6(\bar{i}_{Slot}+1)$ to generate the first DMRS sequence; wherein,
  $c_{init}$ is a parameter in an initialization process of the first DMRS sequence;
  $\bar{i}_{Slot}$ refers to: $\bar{i}_{Slot}=(X_{Slot})$ mod 8,
  or,
  $\bar{i}_{Slot}=3$ LSBs of $(X_{Slot})$, i.e., 3 least significant bits of $X_{Slot}$,
  or, for FR1, $\bar{i}_{Slot}$=2 LSBs of ($X_{Slot}$), i.e., 2 least significant bits of $X_{Slot}$;

for FR2, $\bar{i}_{Slot}$=3 LSBs of ($X_{Slot}$), i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal block index to generate the first DMRS sequence includes:

initializing the first demodulation reference signal (DMRS) sequence by using a formula: $c_{init}=2^{11}(\bar{i}_{S\text{-}SSB}+1)+2^{6}(\bar{i}_{S\text{-}SSB}+1)$ to generate the first DMRS sequence; wherein, $c_{init}$ is a parameter in an initialization process of the first DMRS sequence;

$\bar{i}_{S\text{-}SSB}$ refers to: $\bar{i}_{S\text{-}SSB}$ ($X_{S\text{-}SSB}$) mod 8, or, $\bar{i}_{S\text{-}SSB}$=3 LSBs of ($X_{S\text{-}SSB}$), i.e., 3 least significant bits of $X_{S\text{-}SSB}$, or, for FR1, $\bar{i}_{S\text{-}SSB}$=2 LSBs of ($X_{S\text{-}SSB}$), i.e., 2 least significant bits of $X_{S\text{-}SSB}$;

for FR2, $\bar{i}_{S\text{-}SSB}$=3 LSBs of ($X_{S\text{-}SSB}$), i.e., 3 least significant bits of $X_{S\text{-}SSB}$;

wherein, $X_{S\text{-}SSB}$ refers to the sidelink synchronization signal block index.

Optionally, initializing the first demodulation reference signal (DMRS) sequence based on the sidelink synchronization signal identifier to generate the first DMRS sequence includes:

initializing the first demodulation reference signal (DMRS) sequence by using a formula: $c_{init}=2^{11}(N_{ID}^{SLSS}+1)+2^{6}+N_{ID}^{SLSS}$, or $c_{init}=2^{11}(N_{ID}^{SLSS}+1)+2^{6}$, or $c_{init}=2^{11}(N_{ID}^{SLSS}+1)+N_{ID}^{SLSS}$, or $c_{init}=2^{11}(N_{ID}^{SLSS}+1)$ to generate the first DMRS sequence; wherein, $c_{init}$ is a parameter in an initialization process of the first DMRS sequence; $N_{ID}^{SLSS}$ refers to the sidelink synchronization signal identifier.

Optionally, the DMRS sequence is a GOLD sequence.

An embodiment of the present disclosure further provides a method for receiving a demodulation reference signal of a sidelink, including: receiving a first demodulation reference signal (DMRS) sequence, wherein the first DMRS sequence is generated by a transmitting side terminal through initializing the first DMRS sequence based on at least one of a slot number, a sidelink synchronization signal identifier or a sidelink synchronization signal block index;

demodulating a physical broadcast channel (PBCH) based on the first DMRS sequence.

Optionally, the slot number is a new radio air interface (NR Uu) link slot number or a sidelink slot number.

An embodiment of the present disclosure further provides a terminal, including a transceiver, a processor and a memory, the memory storing a program configured to be executed by the processor; wherein the processor is configured to execute the program to implement: initializing a first demodulation reference signal (DMRS) sequence based on at least one of a slot number, a sidelink synchronization signal identifier or a sidelink synchronization signal block index to generate the first DMRS sequence;

transmitting the first DMRS sequence.

Optionally, the slot number is a new radio air interface (NR Uu) link slot number or a sidelink slot number. Optionally, the initializing the DMRS sequence refers to initialization of a scrambling generator of DMRS sequence.

Optionally, the initializing the DMRS sequence is based on a maximum quantity of S-SSBs transmitted or a subcarrier spacing (SCS).

Optionally, initializing the first demodulation reference signal (DMRS) sequence based on the slot number and the sidelink synchronization signal identifier to generate the first DMRS sequence includes:

initializing the first demodulation reference signal (DMRS) sequence by using a formula: $c_{init}=2^{11}(\bar{i}_{Slot}+1)(N_{ID}^{SLSS}+1)+2^{6}(\bar{i}_{Slot}+1)+N_{ID}^{SLSS}$, or $c_{init}=2^{11}(\bar{i}_{Slot}+1)(N_{ID}^{SLSS}+1)+2^{6}(\bar{i}_{Slot}+1)$ to generate the first DMRS sequence; wherein, $c_{init}$ is a parameter in a initialization process of the first DMRS sequence;

$N_{ID}^{SLSS}$ refers to the sidelink synchronization signal identifier;

$\bar{i}_{Slot}$ refers to: $\bar{i}_{Slot}=(X_{Slot})$ mod 8, or, $\bar{i}_{Slot}$=3 LSBs of ($X_{Slot}$), i.e., 3 least significant bits of $X_{Slot}$, or, for FR1, $\bar{i}_{Slot}$=2 LSBs of ($X_{Slot}$), i.e., 2 least significant bits of $X_{Slot}$;

for FR2, $\bar{i}_{Slot}$=3 LSBs of ($X_{Slot}$), i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal identifier and the sidelink synchronization signal block index to generate the first DMRS sequence includes:

initializing the first demodulation reference signal (DMRS) sequence by using a formula: $c_{init}=2^{11}(\bar{i}_{S\text{-}SSB}+1)(N_{ID}^{SLSS}+1)+2^{6}(\bar{i}_{S\text{-}SSB}+1)+N_{ID}^{SLSS}$, or, $c_{init}=2^{11}(\bar{i}_{S\text{-}SSB}+1)(N_{ID}^{SLSS}+1)+2^{6}(\bar{i}_{S\text{-}SSB}+1)$ to generate the first DMRS sequence; wherein, $c_{init}$ is a parameter in an initialization process of the first DMRS sequence;

$N_{ID}^{SLSS}$ refers to the sidelink synchronization signal identifier;

$\bar{i}_{S\text{-}SSB}$ refers to: $\bar{i}_{S\text{-}SSB}$ ($X_{S\text{-}SSB}$) mod 8, or, $\bar{i}_{S\text{-}SSB}$=3 LSBs of ($X_{S\text{-}SSB}$), i.e., 3 least significant bits of $X_{S\text{-}SSB}$, or, for FR1, $\bar{i}_{S\text{-}SSB}$=2 LSBs of ($X_{S\text{-}SSB}$), i.e., 2 least significant bits of $X_{S\text{-}SSB}$;

for FR2, $\bar{i}_{S\text{-}SSB}$=3 LSBs of ($X_{S\text{-}SSB}$), i.e., 3 least significant bits of $X_{S\text{-}SSB}$;

wherein, $X_{S\text{-}SSB}$ refers to the sidelink synchronization signal block index.

Optionally, initializing the first demodulation reference signal (DMRS) sequence based on the slot number to generate the first DMRS sequence includes:

initializing the first demodulation reference signal (DMRS) sequence by using a formula: $c_{init}=2^{11}(\bar{i}_{Slot}+1)+2^{6}(\bar{i}_{Slot}+1)$ to generate the first DMRS sequence; wherein, $c_{init}$ is a parameter in an initialization process of the first DMRS sequence;

$\bar{i}_{Slot}$ refers to: $\bar{i}_{Slot}=(X_{Slot})$ mod 8, or, $\bar{i}_{Slot}$=3 LSBs of ($X_{Slot}$), i.e., 3 least significant bits of $X_{Slot}$, or, for FR1, $\bar{i}_{Slot}$=2 LSBs of ($X_{Slot}$), i.e., 2 least significant bits of $X_{Slot}$;

for FR2, $\bar{i}_{Slot}$=3 LSBs of ($X_{Slot}$), i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal block index to generate the first DMRS sequence includes:

initializing the first demodulation reference signal (DMRS) sequence by using a formula: $c_{init}=2^{11}(\bar{i}_{S-SSB}+1)+2^6(\bar{i}_{S-SSB}+1)$ to generate the first DMRS sequence; wherein, $c_{init}$ is a parameter in an initialization process of the first DMRS sequence;

$\bar{i}_{S-SSB}$ refers to: $\bar{i}_{S-SSB}$ ($X_{S-SSB}$) mod 8, or, $\bar{i}_{S-SSB}$=3 LSBs of ($X_{S-SSB}$), i.e., 3 least significant bits of $X_{S-SSB}$, or, for FR1, $\bar{i}_{S-SSB}$=2 LSBs of ($X_{S-SSB}$), i.e., 2 least significant bits of $X_{S-SSB}$;

for FR2, $\bar{i}_{S-SSB}$=3 LSBs of ($X_{S-SSB}$), i.e., 3 least significant bits of $X_{S-SSB}$;

wherein, $X_{S-SSB}$ refers to the sidelink synchronization signal block index.

Optionally, initializing the first demodulation reference signal (DMRS) sequence based on the sidelink synchronization signal identifier to generate the first DMRS sequence includes:

initializing the first demodulation reference signal (DMRS) sequence by using a formula: $c_{init}=2^{11}(N_{ID}^{SLSS}+1)+2^6+N_{ID}^{SLSS}$, or $c_{init}=2^{11}(N_{ID}^{SLSS}+1)+2^6$, or $c_{init}=2^{11}(N_{ID}^{SLSS}+1)+N_{ID}^{SLSS}$, or $c_{init}=2^{11}(N_{ID}^{SLSS}+1)$ to generate the first DMRS sequence; wherein, $c_{init}$ is a parameter in an initialization process of the first DMRS sequence;

$N_{ID}^{SLSS}$ refers to the sidelink synchronization signal identifier.

Optionally, the DMRS sequence is a GOLD sequence.

An embodiment of the present disclosure further provides an apparatus for transmitting a demodulation reference signal of a sidelink, applied to a terminal, including:

a processing module, configured to initialize a first demodulation reference signal (DMRS) sequence based on at least one of a slot number, a sidelink synchronization signal identifier or a sidelink synchronization signal block index to generate the first DMRS sequence;

a transceiver module, configured to transmit the first DMRS sequence.

An embodiment of the present disclosure further provides a terminal, including a transceiver, a processor and a memory, the memory storing a program configured to be executed by the processor; wherein the processor is configured to execute the program to implement: receiving a first demodulation reference signal (DMRS) sequence, wherein the first DMRS sequence is generated by a transmitting side terminal through initializing the first DMRS sequence based on at least one of a slot number, a sidelink synchronization signal identifier or a sidelink synchronization signal block index; demodulating a physical broadcast channel (PBCH) based on the first DMRS sequence.

Optionally, the slot number is a new radio air interface (NR Uu) link slot number or a sidelink slot number.

An embodiment of the present disclosure further provides an apparatus for receiving a demodulation reference signal of a sidelink, applied to a terminal, including:

a transceiver module, configured to receive a first demodulation reference signal (DMRS) sequence, wherein the first DMRS sequence is generated by a transmitting side terminal through initializing the first DMRS sequence based on at least one of a slot number, a sidelink synchronization signal identifier or a sidelink synchronization signal block index;

a processing module, configured to demodulate a physical broadcast channel (PBCH) based on the first DMRS sequence.

An embodiment of the present disclosure further provides a processor-readable storage medium storing thereon a processor-executable instruction, wherein the processor-executable instruction is configured to be executed by the processor to implement the above-mentioned methods.

Beneficial effects of some embodiments of the present disclosure are as follows.

In the embodiments of the present disclosure, a first demodulation reference signal (DMRS) sequence is initialized based on at least one of a slot number, a sidelink synchronization signal identifier or a sidelink synchronization signal block index to generate the first DMRS sequence, and the first DMRS sequence is transmitted, such that the receiving side terminal may use the demodulation reference signal (DMRS) sequence to complete the demodulation of the PSBCH, and finally complete the sidelink synchronization process.

DETAILED DESCRIPTION

Exemplary embodiments of the present disclosure will be described in greater detail below with reference to the accompanying drawings. While exemplary embodiments of the present disclosure are shown in the accompanying drawings, it should be understood that the present disclosure can be implemented in various forms and should not be limited by the embodiments set forth herein. Rather, these embodiments are provided to enable a more thorough understanding of the present disclosure and to enable the complete scope of the present disclosure to be conveyed to those skilled in the art.

Figure 1:
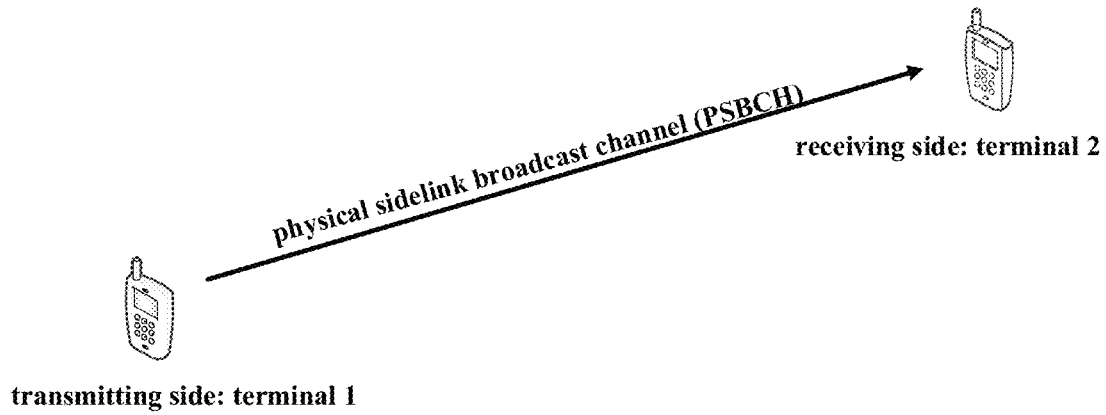
FIG. 1 is a schematic diagram of synchronization between terminals.
Figure 2:
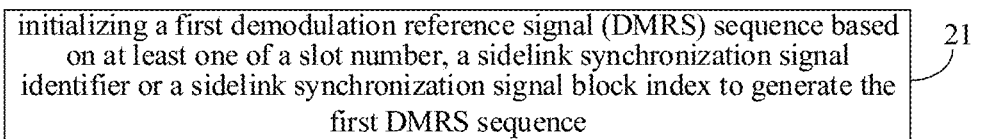
FIG. 2 is a schematic flowchart of a method for transmitting a demodulation reference signal of a sidelink according to an embodiment of the present disclosure.

As shown in FIG. 2, an embodiment of the present disclosure provides a method for transmitting a demodulation reference signal of a sidelink, and the method includes step 21 and step 22.

Step 21, initializing a first demodulation reference signal (DMRS) sequence based on at least one of a slot number, a sidelink synchronization signal identifier or a sidelink synchronization signal block index to generate the first DMRS sequence; the slot number is a new radio air interface (NR Uu) link slot number or a sidelink slot number.

Step 22: transmitting the first DMRS sequence.

This embodiment of the present disclosure enables the receiving side terminal to use the demodulation reference signal (DMRS) sequence to complete the demodulation of the PSBCH, and finally complete the sidelink synchronization process.

In an optional embodiment of the present disclosure, the DMRS sequence is a GOLD sequence. The initializing the DMRS sequence refers to initialization of a scrambling generator of the DMRS sequence. The DMRS sequence may be initialized based on the maximum quantity of sidelink synchronization signal blocks (S-SSBs) transmitted or the subcarrier spacing (SCS).

In the first specific implementation of the foregoing embodiment of the present disclosure, initializing the first demodulation reference signal (DMRS) sequence based on all bits or some bits of the slot number and the sidelink synchronization signal identifier to generate the first DMRS sequence includes:

initializing the first demodulation reference signal (DMRS) sequence by using a formula: $c_{init}=2^{11}(\bar{i}_{Slot}+1)(N_{ID}^{SLSS}+1)+2^{6}(\bar{i}_{Slot}+1)+N_{ID}^{SLSS}$, or $c_{init}=2^{11}(\bar{i}_{Slot}+1)(N_{ID}^{SLSS}+1)+2^{6}(\bar{i}_{Slot}+1)$ to generate the first DMRS sequence; wherein, $c_{init}$ is a parameter in a initialization process of the first DMRS sequence;

$N_{ID}^{SLSS}$ refers to the sidelink synchronization signal identifier;

$\bar{i}_{Slot}$ refers to: $\bar{i}_{Slot}=(X_{Slot})$ mod 8, or, $\bar{i}_{Slot}$=3 LSBs of $(X_{Slot})$, i.e., 3 least significant bits of $X_{Slot}$, or, for frequency range 1 (FR1), $\bar{i}_{Slot}$=2 LSBs of $(X_{Slot})$, i.e., 2 least significant bits of $X_{Slot}$;

for frequency range 2 (FR2), $\bar{i}_{Slot}$=3 LSBs of $(X_{Slot})$, i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

The sidelink demodulation reference signal (DMRS) sequence is a kind of GOLD sequence. After the generation of $c_{init}$, the DMRS sequence can be generated according to the following formula:

$$r(m) = \frac{1}{\sqrt{2}}(1-2 \cdot c(2m)) + j\frac{1}{\sqrt{2}}(1-2 \cdot c(2m+1)),$$

wherein, r(m) is the DMRS sequence; the c(x) sequence is a Gold sequence with a length of 31 and is initialized based on $c_{init}$. That is, c(m) and c(2m+1) here are initialized based on $c_{init}$.

The method for generating the sidelink demodulation reference signal sequence described in this embodiment uses the sidelink synchronization signal identifier and the slot number to initialize the scrambling sequence. Relatively more parameters are used, interference randomization is effective, and 3 least significant bits of the slot number are carried by the DMRS sequence, which reduces the signaling overhead of the PSBCH.

In the second specific implementation of the foregoing embodiment of the present disclosure, initializing the first demodulation reference signal (DMRS) sequence based on the sidelink synchronization signal identifier and the sidelink synchronization signal block index to generate the first DMRS sequence includes:

initializing the first demodulation reference signal (DMRS) sequence by using a formula: $c_{init}=2^{11}(\bar{i}_{S\text{-}SSB}+1)(N_{ID}^{SLSS}+1)+2^{6}(\bar{i}_{S\text{-}SSB}+1)+N_{ID}^{SLSS}$, or, $c_{init}=2^{11}(\bar{i}_{S\text{-}SSB}+1)(N_{ID}^{SLSS}+1)+2^{6}(\bar{i}_{S\text{-}SSB}+1)$ to generate the first DMRS sequence; wherein, $c_{init}$ is a parameter in an initialization process of the first DMRS sequence;

$N_{ID}^{SLSS}$ refers to the sidelink synchronization signal identifier;

$\bar{i}_{S\text{-}SSB}$ refers to: $\bar{i}_{S\text{-}SSB}$ $(X_{S\text{-}SSB})$ mod 8, or, $\bar{i}_{S\text{-}SSB}$=3 LSBs of $(X_{S\text{-}SSB})$, i.e., 3 least significant bits of $X_{S\text{-}SSB}$, or, for FR1, $\bar{i}_{S\text{-}SSB}$=2 LSBs of $(X_{S\text{-}SSB})$, i.e., 2 least significant bits of $X_{S\text{-}SSB}$;

for FR2, $\bar{i}_{S\text{-}SSB}$=3 LSBs of $(X_{S\text{-}SSB})$, i.e., 3 least significant bits of $X_{S\text{-}SSB}$;

wherein, $X_{S\text{-}SSB}$ is the sidelink synchronization signal block index.

The sidelink demodulation reference signal DMRS sequence is a kind of GOLD sequence. After the generation of $c_{init}$, the DMRS sequence can be generated according to the following formula:

$$r(m) = \frac{1}{\sqrt{2}}(1-2 \cdot c(2m)) + j\frac{1}{\sqrt{2}}(1-2 \cdot c(2m+1)),$$

wherein, r(m) is the DMRS sequence, the c(x) sequence is a Gold sequence with a length of 31, and is initialized based on $c_{init}$. That is, c(m) and c(2m+1) here are initialized based on $c_{init}$.

The method for generating the sidelink demodulation reference signal sequence described in this embodiment uses the sidelink synchronization signal identifier and the sidelink synchronization signal block index to initialize the scrambling sequence. Relatively more parameters are used, interference randomization is effective, and 3 least significant bits of the slot number are carried by the DMRS sequence, which reduces the signaling overhead of the PSBCH.

In the third specific implementation of the foregoing embodiment of the present disclosure, initializing the first demodulation reference signal (DMRS) sequence based on all bits or some bits of the slot number to generate the first DMRS sequence includes:

initializing the first demodulation reference signal (DMRS) sequence by using a formula: $c_{init}=2^{11}(\bar{i}_{Slot}+1)+2^6(\bar{i}_{Slot}+1)$ to generate the first DMRS sequence; wherein, $c_{init}$ is a parameter in an initialization process of the first DMRS sequence;

$\bar{i}_{Slot}$ refers to: $\bar{i}_{Slot}=(X_{Slot})$ mod 8, or, $\bar{i}_{Slot}$=3 LSBs of $(X_{Slot})$, i.e., 3 least significant bits of $X_{Slot}$, or, for FR1, $\bar{i}_{Slot}$=2 LSBs of $(X_{Slot})$, i.e., 2 least significant bits of $X_{Slot}$;

for FR2, $\bar{i}_{Slot}$=3 LSBs of $(X_{Slot})$, i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

The sidelink demodulation reference signal (DMRS) sequence is a kind of GOLD sequence. After the generation of $c_{init}$, the DMRS sequence can be generated according to the following formula:

$$r(m) = \frac{1}{\sqrt{2}}(1 - 2 \cdot c(2m)) + j\frac{1}{\sqrt{2}}(1 - 2 \cdot c(2m+1)),$$

wherein, r(m) is the DMRS sequence; the c(x) sequence is a Gold sequence with a length of 31, and is initialized based on $c_{init}$. That is, c(m) and c(2m+1) here are initialized based on $c_{init}$.

The method for generating the sidelink demodulation reference signal sequence described in this embodiment uses the slot number to initialize the scrambling sequence, which has a certain interference randomization effect, and 3 least significant bits of the slot number are carried by the DMRS sequence, reducing the signaling overhead of the PSBCH.

In the fourth specific implementation of the foregoing embodiment of the present disclosure, initializing the first demodulation reference signal (DMRS) sequence based on all bits or some bits of the sidelink synchronization signal block index to generate the first DMRS sequence includes:

initializing the first demodulation reference signal (DMRS) sequence by using a formula: $c_{init}=2^{11}(\bar{i}_{S-SSB}+1)+2^6(\bar{i}_{S-SSB}+1)$ to generate the first DMRS sequence; wherein, $c_{init}$ is a parameter in an initialization process of the first DMRS sequence;

$\bar{i}_{S-SSB}$ refers to: $\bar{i}_{S-SSB}$ $(X_{S-SSB})$ mod 8, or, $\bar{i}_{S-SSB}$=3 LSBs of $(X_{S-SSB})$, i.e., 3 least significant bits of $X_{S-SSB}$, or, for FR1, $\bar{i}_{S-SSB}$=2 LSBs of $(X_{S-SSB})$, i.e., 2 least significant bits of $X_{S-SSB}$;

for FR2, $\bar{i}_{S-SSB}$=3 LSBs of $(X_{S-SSB})$, i.e., 3 least significant bits of $X_{S-SSB}$;

wherein, $X_{S-SSB}$ refers to the sidelink synchronization signal block index.

The sidelink demodulation reference signal DMRS sequence is a kind of GOLD sequence. After the parameter $c_{init}$ is generated, the DMRS sequence can be generated according to the following formula:

$$r(m) = \frac{1}{\sqrt{2}}(1 - 2 \cdot c(2m)) + j\frac{1}{\sqrt{2}}(1 - 2 \cdot c(2m+1)),$$

wherein, r(m) is the DMRS sequence; the c(x) sequence is a Gold sequence with a length of 31, and is initialized based on $c_{init}$. That is, c(m) and c(2m+1) here are initialized based on $c_{init}$.

The method for generating the sidelink demodulation reference signal sequence described in this embodiment uses the sidelink synchronization signal block index to initialize the scrambling sequence, which has a certain interference randomization effect, and 3 least significant bits of the sidelink synchronization signal block index are carried by the DMRS sequence, which reduces the signaling overhead of the PSBCH.

In the fifth specific implementation of the foregoing embodiment of the present disclosure, initializing the first demodulation reference signal (DMRS) sequence based on the sidelink synchronization signal identifier to generate the first DMRS sequence includes:

initializing the first demodulation reference signal (DMRS) sequence by using a formula: $c_{init}=2^{11}(N_{ID}^{SLSS}+1)+2^6+N_{ID}^{SLSS}$, or $c_{init}=2^{11}(N_{ID}^{SLSS}+1)+2^6$ to generate the first DMRS sequence; wherein, $c_{init}$ is a parameter in an initialization process of the first DMRS sequence;

$N_{ID}^{SLSS}$ refers to the sidelink synchronization signal identifier.

The sidelink demodulation reference signal DMRS sequence is a kind of GOLD sequence. After the parameter $c_{init}$ is generated, the DMRS sequence can be generated according to the following formula:

$$r(m) = \frac{1}{\sqrt{2}}(1 - 2 \cdot c(2m)) + j\frac{1}{\sqrt{2}}(1 - 2 \cdot c(2m+1)),$$

wherein, r(m) is the DMRS sequence; the c(x) sequence is a Gold sequence with a length of 31, and is initialized based on $c_{init}$. That is, c(m) and c(2m+1) here are initialized based on $c_{init}$.

The method for generating the sidelink demodulation reference signal sequence described in this embodiment uses the sidelink synchronization signal identifier to initialize the scrambling sequence, which has a certain interference randomization effect, and the DMRS sequence can be obtained without blind detection, which does not incur additional complexity increase and reliability reduction.

In the sixth specific implementation of the foregoing embodiment of the present disclosure, initializing the first demodulation reference signal (DMRS) sequence based on the sidelink synchronization signal identifier to generate the first DMRS sequence includes:

initializing the first demodulation reference signal (DMRS) sequence by using a formula: $c_{init}=2^{11}(N_{ID}^{SLSS}+1)+N_{ID}^{SLSS}$, or, $c_{init}=2^{11}(N_{ID}^{SLSS}+1)$ to generate the first DMRS sequence;

wherein, $c_{init}$ is a parameter in the initialization process of the first DMRS sequence; $N_{ID}^{SLSS}$ refers to the sidelink synchronization signal identifier.

The sidelink demodulation reference signal (DMRS) sequence is a kind of GOLD sequence. After the parameter $c_{init}$ is generated, the DMRS sequence can be generated according to the following formula:

$$r(m) = \frac{1}{\sqrt{2}}(1 - 2 \cdot c(2m)) + j\frac{1}{\sqrt{2}}(1 - 2 \cdot c(2m+1)),$$

wherein, r(m) is the DMRS sequence; the c(x) sequence is a Gold sequence with a length of 31, and is initialized based on $c_{init}$. That is, c(m) and c(2m+1) here are initialized based on $c_{init}$.

The method for generating the sidelink demodulation reference signal sequence described in this embodiment uses the sidelink synchronization signal identifier to initialize the scrambling sequence, which has a certain interference randomization effect, and the DMRS sequence can be obtained without blind detection, which does not incur additional complexity increase and reliability reduction.

In the method for transmitting the demodulation reference signal of the sidelink of the foregoing embodiment of the present disclosure, the transmitting side terminal may initialize the demodulation reference signal sequence based on at least one of a slot number, a sidelink synchronization signal identifier or a sidelink synchronization signal block index, to determine the sidelink demodulation reference signal sequence and send it to the receiving side terminal. The receiving side terminal uses the sequence to complete the demodulation of the PSBCH and finally complete the sidelink synchronization process.

Figure 3:
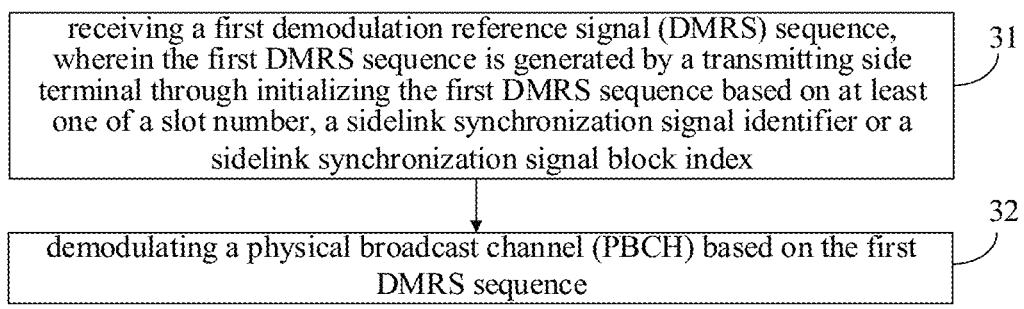
FIG. 3 is a schematic flowchart of a method for receiving a demodulation reference signal of a sidelink according to an embodiment of the present disclosure.

As shown in FIG. 3, an embodiment of the present disclosure further provides a method for receiving a demodulation reference signal of a sidelink, and the method includes step 31 and step 32.

Step 31: receiving a first demodulation reference signal (DMRS) sequence, wherein the first DMRS sequence is generated by a transmitting side terminal through initializing the first DMRS sequence based on at least one of a slot number, a sidelink synchronization signal identifier or a sidelink synchronization signal block index; the slot number is a new radio air interface (NR Uu) link slot number or a sidelink slot number.

Step 32, demodulating a physical broadcast channel (PBCH) based on the first DMRS sequence.

The method of this embodiment is a method of the receiving side terminal that corresponds to the method of the foregoing embodiment shown in FIG. 2. All implementations of the foregoing embodiment are applicable to this embodiment, and the same technical effect can also be achieved.

Figure 4:
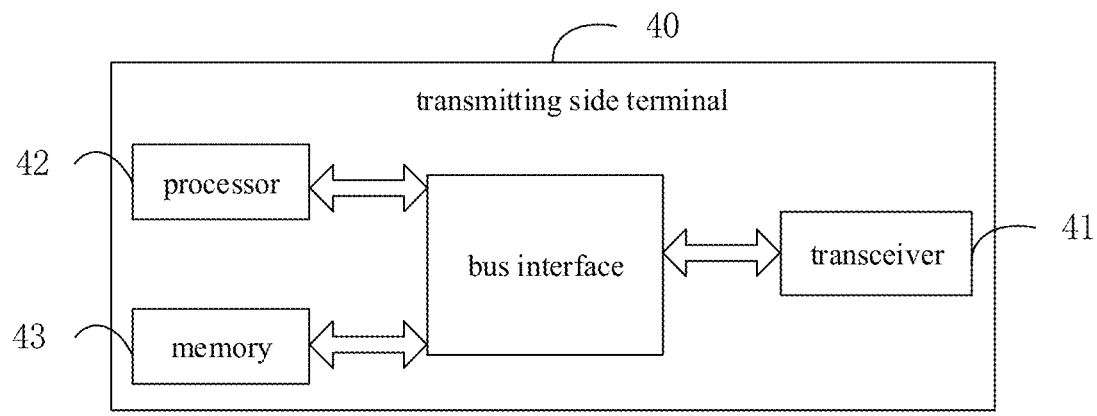
FIG. 4 is a schematic structural diagram of a transmitting side terminal according to an embodiment of the present disclosure.

As shown in FIG. 4, an embodiment of the present disclosure further provides a terminal 40, including: a transceiver 41, a processor 42, and a memory 43, the memory 43 storing a program configured to be executed by the processor; the processor 42 is configured to execute the program to implement: initializing a first demodulation reference signal (DMRS) sequence based on at least one of a slot number, a sidelink synchronization signal identifier or a sidelink synchronization signal block index to generate the first DMRS sequence; the transceiver 41 is configured to transmit the first DMRS sequence.

Optionally, the slot number is a new radio air interface (NR Uu) link slot number or a sidelink slot number. Optionally, the initializing the DMRS sequence refers to initialization of a scrambling generator of the DMRS sequence.

Optionally, the initializing the DMRS sequence is based on a maximum quantity of S-SSBs transmitted or a subcarrier spacing (SCS).

Optionally, the initializing the first demodulation reference signal (DMRS) sequence based on the slot number and the sidelink synchronization signal identifier to generate the first DMRS sequence includes:
initializing the first demodulation reference signal (DMRS) sequence by using a formula: $c_{init}=2^{11}$ $(\bar{i}_{Slot}+1)(N_{ID}^{SLSS}+1)+2^6(\bar{i}_{Slot}+1)+N_{ID}^{SLSS}$, or $c_{init}=2^{11}$ $(\bar{i}_{Slot}+1)(N_{ID}^{SLSS}+1)+2^6(\bar{i}_{Slot}+1)$ to generate the first DMRS sequence; wherein, $c_{init}$ is a parameter in a initialization process of the first DMRS sequence;

$N_{ID}^{SLSS}$ refers to the sidelink synchronization signal identifier;

$\bar{i}_{Slot}$ refers to: $\bar{i}_{Slot}=(X_{Slot})$ mod 8, or, $\bar{i}_{Slot}=$3 LSBs of $(X_{Slot})$, i.e., 3 least significant bits of $X_{Slot}$, or, for FR1, $\bar{i}_{Slot}=$2 LSBs of $(X_{Slot})$, i.e., 2 least significant bits of $X_{Slot}$;

for FR2, $\bar{i}_{Slot}=$3 LSBs of $(X_{Slot})$, i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal identifier and the sidelink synchronization signal block index to generate the first DMRS sequence includes:
initializing the first demodulation reference signal (DMRS) sequence by using a formula: $c_{init}=2^{11}$ $(\bar{i}_{S-SSB}+1)(N_{ID}^{SLSS}+1)+2^6(\bar{i}_{S-SSB}+1)+N_{ID}^{SLSS}$, or, $c_{init}=2^{11}(\bar{i}_{S-SSB}+1)(N_{ID}^{SLSS}+1)+2^6(\bar{i}_{S-SSB}+1)$ to generate the first DMRS sequence; wherein, $c_{init}$ is a parameter in an initialization process of the first DMRS sequence;

$N_{ID}^{SLSS}$ refers to the sidelink synchronization signal identifier;

$\bar{i}_{S-SSB}$ refers to: $\bar{i}_{S-SSB} (X_{S-SSB})$ mod 8, or, $\bar{i}_{S-SSB}=$3 LSBs of $(X_{S-SSB})$, i.e., 3 least significant bits of $X_{S-SSB}$, or, for FR1, $\bar{i}_{S-SSB}=$2 LSBs of $(X_{S-SSB})$, i.e., 2 least significant bits of $X_{S-SSB}$;

for FR2, $\bar{i}_{S-SSB}=$3 LSBs of $(X_{S-SSB})$, i.e., 3 least significant bits of $X_{S-SSB}$;

wherein, $X_{S-SSB}$ refers to the sidelink synchronization signal block index.

Optionally, initializing the first demodulation reference signal (DMRS) sequence based on the slot number to generate the first DMRS sequence includes:
initializing the first demodulation reference signal (DMRS) sequence by using a formula: $c_{init}=2^{11}$ $(\bar{i}_{Slot}+1)+2^6(\bar{i}_{Slot}+1)$ to generate the first DMRS sequence; wherein, $c_{init}$ is a parameter in an initialization process of the first DMRS sequence;

$\bar{i}_{Slot}$ refers to: $\bar{i}_{Slot}=(X_{Slot})$ mod 8, or, $\bar{i}_{Slot}=$3 LSBs of $(X_{Slot})$, i.e., 3 least significant bits of $X_{Slot}$, or, for FR1, $\bar{i}_{Slot}=$2 LSBs of $(X_{Slot})$, i.e., 2 least significant bits of $X_{Slot}$;

for FR2, $\bar{i}_{Slot}=$3 LSBs of $(X_{Slot})$, i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal block index to generate the first DMRS sequence includes:

initializing the first demodulation reference signal (DMRS) sequence by using a formula: $c_{init}=2^{11}(\bar{i}_{S\text{-}SSB}+1)+2^6(\bar{i}_{S\text{-}SSB}+1)$ to generate the first DMRS sequence; wherein, $c_{init}$ is a parameter in an initialization process of the first DMRS sequence;

$\bar{i}_{S\text{-}SSB}$ refers to: $\bar{i}_{S\text{-}SSB}=(X_{S\text{-}SSB})$ mod 8, or, $\bar{i}_{S\text{-}SSB}=3$ LSBs of $(X_{S\text{-}SSB})$, i.e., 3 least significant bits of $X_{S\text{-}SSB}$, or, for FR1, $\bar{i}_{S\text{-}SSB}=2$ LSBs of $(X_{S\text{-}SSB})$, i.e., 2 least significant bits of $X_{S\text{-}SSB}$;

for FR2, $\bar{i}_{S\text{-}SSB}=3$ LSBs of $(X_{S\text{-}SSB})$, i.e., 3 least significant bits of $X_{S\text{-}SSB}$;

wherein, $X_{S\text{-}SSB}$ refers to the sidelink synchronization signal block index.

Optionally, initializing the first demodulation reference signal (DMRS) sequence based on the sidelink synchronization signal identifier to generate the first DMRS sequence includes:

initializing the first demodulation reference signal (DMRS) sequence by using a formula: $c_{init}=2^{11}(N_{ID}^{SLSS}+1)+2^6+N_{ID}^{SLSS}$, or $c_{init}=2^{11}(N_{ID}^{SLSS}+1)+2^6$, or $c_{init}=2^{11}(N_{ID}^{SLSS}+1)+N_{ID}^{SLSS}$, or $c_{init}=2^{11}(N_{ID}^{SLSS}+1)$ to generate the first DMRS sequence; wherein, $c_{init}$ is a parameter in an initialization process of the first DMRS sequence;

$N_{ID}^{SLSS}$ refers to the sidelink synchronization signal identifier.

Optionally, the DMRS sequence is a GOLD sequence.

It should be noted that the terminal in this embodiment is a terminal corresponding to the method shown in FIG. 2, and the implementation manners in the foregoing embodiments are all applicable to the embodiments of the terminal, and the same technical effect can also be achieved. In the terminal, the transceiver 41 and the memory 43, as well as the transceiver 41 and the processor 42 can be in communication connection through a bus interface, the function of the processor 42 can also be realized by the transceiver 41, and the function of the transceiver 41 can also be realized by the processor 42. It should be noted here that the foregoing terminal provided by some embodiments of the present disclosure can implement all the method steps implemented by the foregoing method embodiments and can achieve the same technical effect. Description of the parts and beneficial effects of this embodiment same as those of the method embodiments will be omitted.

Figure 5:
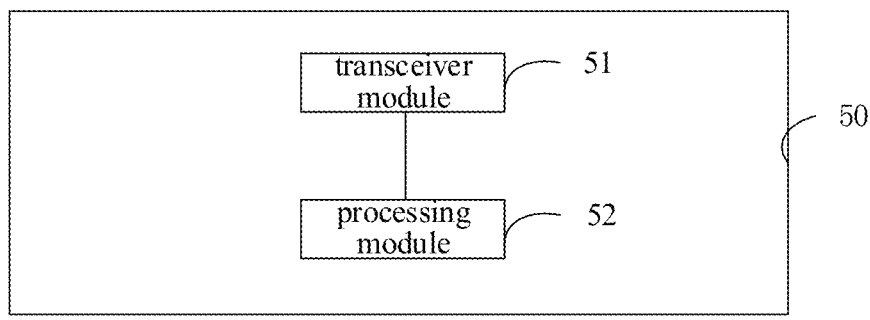
FIG. 5 is a block diagram of an apparatus for transmitting a demodulation reference signal of a sidelink according to an embodiment of the present disclosure.

As shown in FIG. 5, an embodiment of the present disclosure further provides an apparatus 50 for transmitting a sidelink demodulation reference signal, which is applied to a terminal, and the apparatus 50 includes:

a processing module 52, configured to initialize a first demodulation reference signal (DMRS) sequence based on at least one of a slot number, a sidelink synchronization signal identifier or a sidelink synchronization signal block index to generate the first DMRS sequence;

a transceiver module 51, configured to transmit the first DMRS sequence.

Optionally, the slot number is a new radio air interface (NR Uu) link slot number or a sidelink slot number. Optionally, the initializing the DMRS sequence refers to initialization of a scrambling generator of the DMRS sequence.

Optionally, the initializing the DMRS sequence is based on a maximum quantity of S-SSBs transmitted or a subcarrier spacing (SCS).

Optionally, initializing the first demodulation reference signal (DMRS) sequence based on the slot number and the sidelink synchronization signal identifier to generate the first DMRS sequence includes:

initializing the first demodulation reference signal (DMRS) sequence by using a formula: $c_{init}=2^{11}(\bar{i}_{Slot}+1)(N_{ID}^{SLSS}+1)+2^6(\bar{i}_{Slot}+1)+N_{ID}^{SLSS}$, or $c_{init}=2^{11}(\bar{i}_{Slot}+1)(N_{ID}^{SLSS}+1)+2^6(\bar{i}_{Slot}+1)$ to generate the first DMRS sequence; wherein, $c_{init}$ is a parameter in a initialization process of the first DMRS sequence;

$N_{ID}^{SLSS}$ refers to the sidelink synchronization signal identifier;

$\bar{i}_{Slot}$ refers to: $\bar{i}_{Slot}=(X_{Slot})$ mod 8, or, $\bar{i}_{Slot}=3$ LSBs of $(X_{Slot})$, i.e., 3 least significant bits of $X_{Slot}$, or, for FR1, $\bar{i}_{Slot}=2$ LSBs of $(X_{Slot})$, i.e., 2 least significant bits of $X_{Slot}$;

for FR2, $\bar{i}_{Slot}=3$ LSBs of $(X_{Slot})$, i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal identifier and the sidelink synchronization signal block index to generate the first DMRS sequence includes:

initializing the first demodulation reference signal (DMRS) sequence by using a formula: $c_{init}=2^{11}(\bar{i}_{S\text{-}SSB}+1)(N_{ID}^{SLSS}+1)+2^6(\bar{i}_{S\text{-}SSB}+1)+N_{ID}^{SLSS}$, or, $c_{init}=2^{11}(\bar{i}_{S\text{-}SSB}+1)(N_{ID}^{SLSS}+1)+2^6(\bar{i}_{S\text{-}SSB}+1)$ to generate the first DMRS sequence; wherein, $c_{init}$ is a parameter in an initialization process of the first DMRS sequence;

$N_{ID}^{SLSS}$ refers to the sidelink synchronization signal identifier;

$\bar{i}_{S\text{-}SSB}$ refers to: $\bar{i}_{S\text{-}SSB}=(X_{S\text{-}SSB})$ mod 8, or, $\bar{i}_{S\text{-}SSB}=3$ LSBs of $(X_{S\text{-}SSB})$, i.e., 3 least significant bits of $X_{S\text{-}SSB}$, or, for FR1, $\bar{i}_{S\text{-}SSB}=2$ LSBs of $(X_{S\text{-}SSB})$, i.e., 2 least significant bits of $X_{S\text{-}SSB}$;

for FR2, $\bar{i}_{S\text{-}SSB}=3$ LSBs of $(X_{S\text{-}SSB})$, i.e., 3 least significant bits of $X_{S\text{-}SSB}$;

wherein, $X_{S\text{-}SSB}$ refers to the sidelink synchronization signal block index.

Optionally, initializing the first demodulation reference signal (DMRS) sequence based on the slot number to generate the first DMRS sequence includes:

initializing the first demodulation reference signal (DMRS) sequence by using a formula: $c_{init}=2^{11}(\bar{i}_{Slot}+1)+2^6(\bar{i}_{Slot}+1)$ to generate the first DMRS sequence; wherein, $c_{init}$ is a parameter in an initialization process of the first DMRS sequence;

$\bar{i}_{Slot}$ refers to: $\bar{i}_{Slot}=(X_{Slot})$ mod 8, or, $\bar{i}_{Slot}$=3 LSBs of ($X_{Slot}$), i.e., 3 least significant bits of $X_{Slot}$, or, for FR1, $\bar{i}_{Slot}$=2 LSBs of ($X_{Slot}$), i.e., 2 least significant bits of $X_{Slot}$;

for FR2, $\bar{i}_{Slot}$=3 LSBs of ($X_{Slot}$), i.e., 3 least significant bits of $X_{Slot}$;

wherein, $X_{Slot}$ refers to a slot number in a radio frame, and the slot number is a serial number of a slot in a radio frame of a new radio air interface (NR Uu) link, or a serial number of a slot in a radio frame of the sidelink.

Optionally, initializing the first demodulation reference signal (DMRS) sequence based on the sidelink synchronization signal block index to generate the first DMRS sequence includes:

initializing the first demodulation reference signal (DMRS) sequence by using a formula: $c_{init}=2^{11}(\bar{i}_{S-SSB}+1)+2^{6}(\bar{i}_{S-SSB}+1)$ to generate the first DMRS sequence; wherein, $c_{init}$ is a parameter in an initialization process of the first DMRS sequence;

$\bar{i}_{S-SSB}$ refers to: $\bar{i}_{S-SSB}$ ($X_{S-SSb}$) mod 8, or, $\bar{i}_{S-SSB}$=3 LSBs of ($X_{S-SSB}$), i.e., 3 least significant bits of $X_{S-SSB}$, or, for FR1, $\bar{i}_{S-SSB}$=2 LSBs of ($X_{S-SSB}$), i.e., 2 least significant bits of $X_{S-SSB}$;

for FR2, $\bar{i}_{S-SSB}$=3 LSBs of ($X_{S-SSB}$), i.e., 3 least significant bits of $X_{S-SSB}$;

wherein, $X_{S-SSB}$ refers to the sidelink synchronization signal block index.

Optionally, initializing the first demodulation reference signal (DMRS) sequence based on the sidelink synchronization signal identifier to generate the first DMRS sequence includes:

initializing the first demodulation reference signal (DMRS) sequence by using a formula: $c_{init}=2^{11}(N_{ID}^{SLSS}+1)+2^{6}+N_{ID}^{SLSS}$, or $c_{init}=2^{11}(N_{ID}^{SLSS}+1)+2^{6}$, or $c_{init}=2^{11}(N_{ID}^{SLSS}+1)+N_{ID}^{SLSS}$, or $c_{init}=2^{11}(N_{ID}^{SLSS}+1)$ to generate the first DMRS sequence; wherein, $c_{init}$ is a parameter in an initialization process of the first DMRS sequence;

$N_{ID}^{SLSS}$ refers to the sidelink synchronization signal identifier.

Optionally, the DMRS sequence is a GOLD sequence.

It should be noted that the apparatus in this embodiment is an apparatus corresponding to the method shown in FIG. 2, and the implementation manners in each of the foregoing embodiments are applicable to the embodiments of the apparatus, and the same technical effect can also be achieved. The apparatus may further include a processing module 52, etc., configured to process the information sent by the transceiver module 51, etc. Here, it should be noted that the foregoing apparatuses provided by some embodiments of the present disclosure can implement all the method steps implemented by the foregoing method embodiments, and can achieve the same technical effect. Description of the parts and beneficial effects of this embodiment same as those of the method embodiments is omitted.

Figure 6:
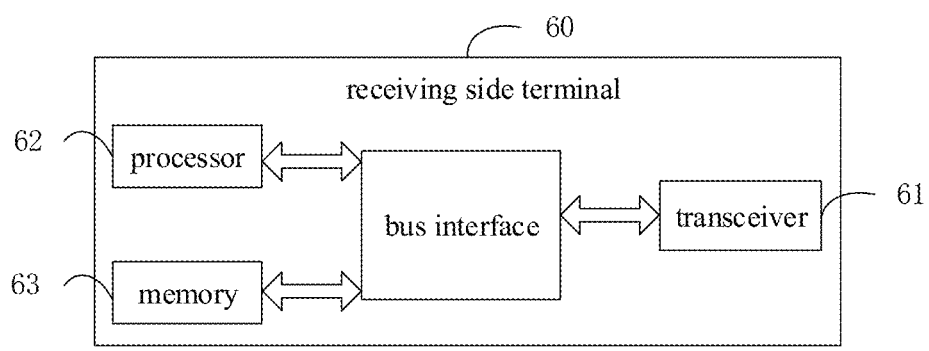
FIG. 6 is a schematic structural diagram of a receiving side terminal according to an embodiment of the present disclosure.

As shown in FIG. 6, an embodiment of the present disclosure further provides a terminal 60, including: a transceiver 61, a processor 62, and a memory 63, the memory 63 storing a program configured to be executed by the processor 62; wherein the processor is configured to execute the program to implement: receiving a first demodulation reference signal (DMRS) sequence, wherein the first DMRS sequence is generated by a transmitting side terminal through initializing the first DMRS sequence based on at least one of a slot number, a sidelink synchronization signal identifier or a sidelink synchronization signal block index; demodulating a physical broadcast channel (PBCH) based on the first DMRS sequence.

Optionally, the slot number is a new radio air interface (NR Uu) link slot number or a sidelink slot number.

It should be noted that the terminal in this embodiment is a terminal corresponding to the method shown in FIG. 3, and the implementation manners in the foregoing embodiments are all applicable to the embodiments of the terminal, and the same technical effect can also be achieved. In the terminal, the transceiver 61 and the memory 63, as well as the transceiver 61 and the processor 62 can be in communication connection through a bus interface, the function of the processor 62 can also be realized by the transceiver 61, and the function of the transceiver 61 can also be realized by the processor 62. It should be noted here that the foregoing terminal provided by some embodiments of the present disclosure can implement all the method steps implemented by the foregoing method embodiments and can achieve the same technical effect. Description of the parts and beneficial effects of this embodiment same as those of the method embodiments is omitted.

Figure 7:
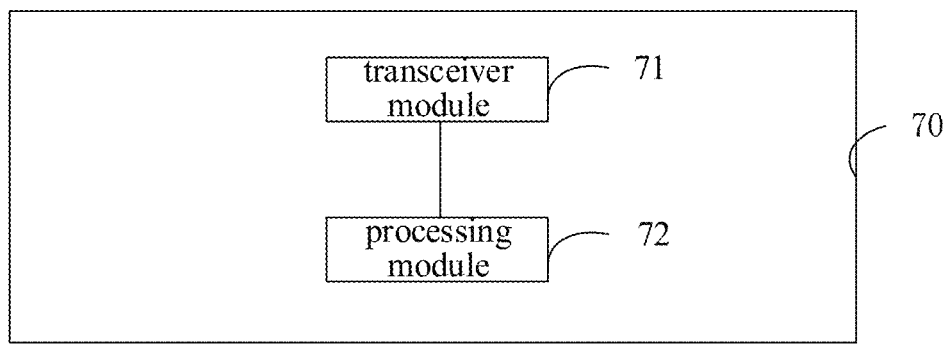
FIG. 7 is a schematic block diagram of an apparatus for receiving a demodulation reference signal of a sidelink according to an embodiment of the present disclosure.

As shown in FIG. 7, an embodiment of the present disclosure further provides an apparatus 70 for receiving a demodulation reference signal of a sidelink, which is applied to a terminal, and the apparatus includes:

a transceiver module 71, configured to receive a first demodulation reference signal (DMRS) sequence, wherein the first DMRS sequence is generated by a transmitting side terminal through initializing the first DMRS sequence based on at least one of a slot number, a sidelink synchronization signal identifier or a sidelink synchronization signal block index;

a processing module 72, configured to demodulate a physical broadcast channel (PBCH) based on the first DMRS sequence.

Optionally, the slot number is a new radio air interface (NR Uu) link slot number or a sidelink slot number.

It should be noted that the apparatus in this embodiment is an apparatus corresponding to the method shown in FIG. 2, and the implementation manners in each of the foregoing embodiments are applicable to the embodiments of the apparatus, and the same technical effect can also be achieved. The apparatus may further include a processing module 72, etc., configured to process the information sent by the transceiver module 71, etc. Here, it should be noted that the foregoing apparatuses provided by some embodiments of the present disclosure can implement all the method steps implemented by the foregoing method embodiments, and can achieve the same technical effect. Description of the parts and beneficial effects of this embodiment same as those of the method embodiments is omitted.

An embodiment of the present disclosure further provides a processor-readable storage medium storing thereon a processor-executable instruction, wherein the processor-executable instruction is configured to be executed by the processor to implement the methods as shown in FIG. 2 or FIG. 3. All the implementations of the foregoing method embodiments can apply to this embodiment, and the same technical effect can also be achieved.

A person skilled in the art may realize that the units and algorithm steps described in the embodiments disclosed herein can be implemented by electronic hardware or a combination of computer software and electronic hardware. Whether these functions are performed by hardware or software depends on the specific application and design constraint conditions of the technical solution. A person skilled in the art can use different methods for each specific application to implement the described functions, but such implementation should not be considered as going beyond the scope of the present disclosure.

A person skilled in the art can clearly understand that, for convenience and conciseness of the description, for the specific working process of the system, device, and unit described above, references may be made to the corresponding process in the foregoing method embodiments, which is not repeated here.

In the embodiments provided in the present disclosure, it should be understood that the disclosed device and method may be implemented in other ways. For example, the device embodiments described above are only illustrative, for example, the division of the units is only a logical function division, and there may be other type of divisions in actual implementation, for example, multiple units or components may be combined or it can be integrated into another system, or some features can be ignored or not implemented. In addition, the displayed or discussed mutual coupling or direct coupling or communication connection may be indirect coupling or communication connection through some interfaces, devices, or units, and may be in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer-readable storage medium. Based on such an understanding, essential parts, or parts contributing to the related art, of the technical solution of the present disclosure may be implemented in a form of a software product. The computer software product is stored in a storage medium and includes several instructions to make a computer device (which may be a personal computer, a server, or a network device, etc.) to execute all or part of the steps of the methods described in the various embodiments of the present disclosure. The aforementioned storage media include: U disk, mobile hard disk, read-only memory (ROM), random access memory (RAM), magnetic disk or optical disc, and other media that can store program codes.

In addition, it should be pointed out that in the device and method of the present disclosure, obviously, each component or each step can be decomposed and/or recombined. This decomposition and/or recombination should be regarded as equivalent solutions of the present disclosure. In addition, the steps of performing the above series of processing can naturally be performed in a chronological order in description, but do not necessarily need to be performed in the chronological order, and some steps can be performed in parallel or independently of each other. A person skilled in the art can understand that all or any of the steps or components of the method and device of the present disclosure can be used in any computing device (including a processor, storage medium, etc.) or a network of computing devices, and implemented by hardware, firmware, software, or any combination thereof. This can be achieved by those skilled in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved by only providing a program product containing program code for implementing the method or device of the present disclosure. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. This decomposition and/or recombination should be regarded as equivalent solutions of the present disclosure. In addition, the steps of executing the above-mentioned series of processing can naturally be executed in a chronological order in the description, but it is not necessarily executed in the chronological order. Some steps can be performed in parallel or independently of each other.

The individual modules, units, subunits, or submodules may be one or more integrated circuits configured to implement the above method, e.g., one or more application specific integrated circuits (ASICs), or, one or more digital signal processors (DSPs), or, one or more field programmable gate arrays (FPGAs), etc. Further, when one of the above modules is implemented in the form of a processing element scheduling program codes, the processing element may be a general purpose processor, such as a central processing unit (CPU) or other processor that can call program codes. Further, these modules may be integrated together and implemented as a system-on-a-chip (SOC). The above are optional implementations of the present disclosure. It should be pointed out that for a person skilled in the art, several improvements and modifications can be made without departing from the principles of the present disclosure. These improvements and modifications should also fall within the scope of the present disclosure.

What is claimed is:

1. A method for transmitting a demodulation reference signal of a sidelink, applied to a transmitting side terminal, comprising:
   initializing a first demodulation reference signal (DMRS) sequence based on a sidelink synchronization signal identifier, to generate the first DMRS sequence;
   transmitting the first DMRS sequence.

2. The method for transmitting the demodulation reference signal of the sidelink according to claim 1, wherein the initializing refers to initialization of a scrambling generator of DMRS sequence.

3. The method for transmitting the demodulation reference signal of the sidelink according to claim 1, wherein the initializing is based on a maximum quantity of sidelink synchronization signal blocks (S-SSBs) transmitted or a subcarrier spacing (SCS).

4. The method for transmitting the demodulation reference signal of the sidelink according to claim 1, wherein initializing the first demodulation reference signal (DMRS) sequence based on the sidelink synchronization signal identifier to generate the first DMRS sequence comprises:
initializing the first demodulation reference signal (DMRS) sequence by using a formula: $c_{init}=2^{11}(\bar{i}_{Slot}+1)(N_{ID}^{SLSS}+1)+2^6(\bar{i}_{Slot}+1)+N_{ID}^{SLSS}$, or $c_{init}=2^{11}(\bar{i}_{Slot}+1)(N_{ID}^{SLSS}+1)+2^6(\bar{i}_{Slot}+1)$ to generate the first DMRS sequence;
wherein,
$c_{init}$ is a parameter in a initialization process of the first DMRS sequence;
$N_{ID}^{SLSS}$ refers to the sidelink synchronization signal identifier;
$\bar{i}_{Slot}$ refers to: $\bar{i}_{Slot}=(X_{Slot})$ mod 8, or,
$\bar{i}_{Slot}=3$ LSBs of $(X_{Slot})$, i.e., 3 least significant bits of $X_{Slot}$, or,
for FR1, $\bar{i}_{Slot}=2$ LSBs of $(X_{Slot})$, i.e., 2 least significant bits of $X_{Slot}$;
for FR2, $\bar{i}_{Slot}=3$ LSBs of $(X_{Slot})$, i.e., 3 least significant bits of $X_{slot}$;
wherein, $X_{Slot}$ refers to a slot number in a radio frame, and the slot number is a serial number of a slot in a radio frame of a new radio air interface (NR Uu) link, or a serial number of a slot in a radio frame of the sidelink;

or,
wherein initializing the first demodulation reference signal (DMRS) sequence based on the sidelink synchronization signal identifier to generate the first DMRS sequence comprises:
initializing the first demodulation reference signal (DMRS) sequence by using a formula: $c_{init}=2^{11}(\bar{i}_{S\text{-}SSB}+1)(N_{ID}^{SLSS}+1)+2^6(\bar{i}_{S\text{-}SSB}+1)+N_{ID}^{SLSS}$, or $c_{init}=2^{11}(\bar{i}_{S\text{-}SSB}+1)(N_{ID}^{SLSS}+1)+2^6(\bar{i}_{S\text{-}SSB}+1)$ to generate the first DMRS sequence;
wherein,
$c_{init}$ is a parameter in an initialization process of the first DMRS sequence;
$N_{ID}^{SLSS}$ refers to the sidelink synchronization signal identifier;
$\bar{i}_{S\text{-}SSB}$ refers to: $\bar{i}_{S\text{-}SSB}=(X_{S\text{-}SSB})$ mod 8, or,
$\bar{i}_{S\text{-}SSB}=3$ LSBs of $(X_{S\text{-}SSB})$, i.e., 3 least significant bits of $X_{S\text{-}SSB}$, or,
for FR1, $\bar{i}_{S\text{-}SSB}=2$ LSBs of $(X_{S\text{-}SSB})$, i.e., 2 least significant bits of $X_{S\text{-}SSB}$;
for FR2, $\bar{i}_{S\text{-}SSB}=3$ LSBs of $(X_{S\text{-}SSB})$, i.e., 3 least significant bits of $X_{S\text{-}SSB}$;
wherein, $X_{S\text{-}SSB}$ refers to a sidelink synchronization signal block index;

or,
wherein initializing the first demodulation reference signal (DMRS) sequence based on the sidelink synchronization signal identifier to generate the first DMRS sequence comprises:
initializing the first demodulation reference signal (DMRS) sequence by using a formula: $c_{init}=2^{11}(N_{ID}^{SLSS}+1)+2^6+N_{ID}^{SLSS}$, or $c_{init}=2^{11}(N_{ID}^{SLSS}+1)+2^6$, or $c_{init}=2^{11}(N_{ID}^{SLSS}+1)+N_{ID}^{SLSS}$, or $c_{init}=2^{11}(N_{ID}^{SLSS}+1)$ to generate the first DMRS sequence;
wherein,
$c_{init}$ is a parameter in an initialization process of the first DMRS sequence;
$N_{ID}^{SLSS}$ refers to the sidelink synchronization signal identifier.

5. The method for transmitting the demodulation reference signal of the sidelink according to claim 1, wherein the first DMRS sequence is a GOLD sequence.

6. A method for receiving a demodulation reference signal of a sidelink, comprising:
receiving a first demodulation reference signal (DMRS) sequence, wherein the first DMRS sequence is generated by a transmitting side terminal through initializing the first DMRS sequence based on a sidelink synchronization signal identifier;
demodulating a physical broadcast channel (PBCH) based on the first DMRS sequence.

7. A terminal, comprising a transceiver, a processor and a memory, the memory storing a program configured to be executed by the processor; wherein the processor is configured to execute the program to implement: initializing a first demodulation reference signal (DMRS) sequence based on a sidelink synchronization signal identifier to generate the first DMRS sequence;
transmitting the first DMRS sequence.

8. The terminal according to claim 7, wherein the initializing refers to initialization of a scrambling generator of DMRS sequence.

9. The terminal according to claim 7, wherein the initializing is based on a maximum quantity of S-SSBs transmitted or a subcarrier spacing (SCS).

10. The terminal according to claim 7,
wherein initializing the first demodulation reference signal (DMRS) sequence based on the sidelink synchronization signal identifier to generate the first DMRS sequence comprises:
initializing the first demodulation reference signal (DMRS) sequence by using a formula: $c_{init}=2^{11}(\bar{i}_{Slot}+1)(N_{ID}^{SLSS}+1)+2^6(\bar{i}_{Slot}+1)+N_{ID}^{SLSS}$, or $c_{init}=2^{11}(\bar{i}_{Slot}+1)(N_{ID}^{SLSS}+1)+2^6(\bar{i}_{Slot}+1)$ to generate the first DMRS sequence;
wherein,
$c_{init}$ is a parameter in a initialization process of the first DMRS sequence;
$N_{ID}^{SLSS}$ refers to the sidelink synchronization signal identifier;
$\bar{i}_{Slot}$ refers to: $\bar{i}_{Slot}=(X_{Slot})$ mod 8, or,
$\bar{i}_{Slot}=3$ LSBs of $(X_{Slot})$, i.e., 3 least significant bits of $X_{Slot}$, or,
for FR1, $\bar{i}_{Slot}=2$ LSBs of $(X_{Slot})$, i.e., 2 least significant bits of $X_{Slot}$;
for FR2, $\bar{i}_{Slot}=3$ LSBs of $(X_{Slot})$, i.e., 3 least significant bits of $X_{Slot}$;
wherein, $X_{Slot}$ refers to a slot number in a radio frame, and the slot number is a serial number of a slot in a radio frame of a new radio air interface (NR Uu) link, or a serial number of a slot in a radio frame of the sidelink;

or,
wherein initializing the first demodulation reference signal (DMRS) sequence based on the sidelink synchronization signal identifier to generate the first DMRS sequence comprises:
initializing the first demodulation reference signal (DMRS) sequence by using a formula: $c_{init}=2^{11}(\bar{i}_{S\text{-}SSB}+1)(N_{ID}^{SLSS}+1)+2^6(\bar{i}_{S\text{-}SSB}+1)+N_{ID}^{SLSS}$, or, $c_{init}=2^{11}(\bar{i}_{S\text{-}SSB}+1)(N_{ID}^{SLSS}+1)+2^6(\bar{i}_{S\text{-}SSB}+1)$ to generate the first DMRS sequence;
wherein,
$c_{init}$ is a parameter in an initialization process of the first DMRS sequence;

$N_{ID}^{NSLSS}$ refers to the sidelink synchronization signal identifier;

$\bar{i}_{S-SSB}$ refers to: $\bar{i}_{S-SSB}=(X_{S-SSB})$ mod 8, or, $\bar{i}_{S-SSB}$=3 LSBs of $(X_{S-SSB})$, i.e., 3 least significant bits of $X_{S-SSB}$, or, for FR1, $\bar{i}_{S-SSB}$=2 LSBs of $(X_{S-SSB})$, i.e., 2 least significant bits of $X_{S-SSB}$;

for FR2, IS-SSB=3 LSBs of $(X_{S-SSB})$, i.e., 3 least significant bits of $X_{S-SSB}$;

wherein, $X_{S-SSB}$ refers to a sidelink synchronization signal block index;

or, wherein initializing the first demodulation reference signal (DMRS) sequence based on the sidelink synchronization signal identifier to generate the first DMRS sequence comprises:

initializing the first demodulation reference signal (DMRS) sequence by using a formula: $c_{init}=2^{11}(N_{ID}^{SLSS}+1)+2^6+N_{ID}^{SLSS}$, or $c_{init}=2^{11}(N_{ID}^{SLSS}+1)+2^6$, or $c_{init}=2^{11}(N_{ID}^{SLSS}+1)+N_{ID}^{SLSS}$, or $c_{init}=2^{11}(N_{ID}^{SLSS}+1)$ to generate the first DMRS sequence;

wherein, $c_{init}$ is a parameter in an initialization process of the first DMRS sequence;

$N_{ID}^{SLSS}$ refers to the sidelink synchronization signal identifier.

11. The terminal according to claim 7, wherein the first DMRS sequence is a GOLD sequence.

12. A terminal, comprising a transceiver, a processor and a memory, the memory storing a program configured to be executed by the processor; wherein the processor is configured to execute the program to implement steps of the method according to claim 6.

13. A non-transitory processor-readable storage medium storing thereon a processor-executable instruction, wherein the processor-executable instruction is configured to be executed by a processor to implement the method according to claim 1.

14. A non-transitory processor-readable storage medium storing thereon a processor-executable instruction, wherein the processor-executable instruction is configured to be executed by a processor to implement the method according to claim 6.

\* \* \* \* \*